March 28, 1933.                W. G. BOTTOM                1,902,828
                    WELL BORE ANGLE DETECTOR AND RECORDER
                            Filed Aug. 27, 1930

INVENTOR
BY *William G. Bottom*
*Arthur C. Brown*
ATTORNEY

Patented Mar. 28, 1933

1,902,828

UNITED STATES PATENT OFFICE

WILLIAM G. BOTTOM, OF TULSA, OKLAHOMA

WELL BORE ANGLE DETECTOR AND RECORDER

Application filed August 27, 1930. Serial No. 478,121.

My invention relates to apparatus for determining the inclination of well holes and has for its principal objects to provide a device of this character that is sufficiently compact to readily pass through the smallest tool joints, whereby the degree of inclination of the hole may be permanently recorded on blanks that may be easily read and filed for future reference, and whereby the recording operation may be deferred until the instrument has been lowered to a predetermined point in or to the bottom of the well hole.

In accomplishing these and other objects of my invention I have provided improved details of structure, the preferred form of which is illustrated in the accompanying drawing, wherein.

Figure 1:
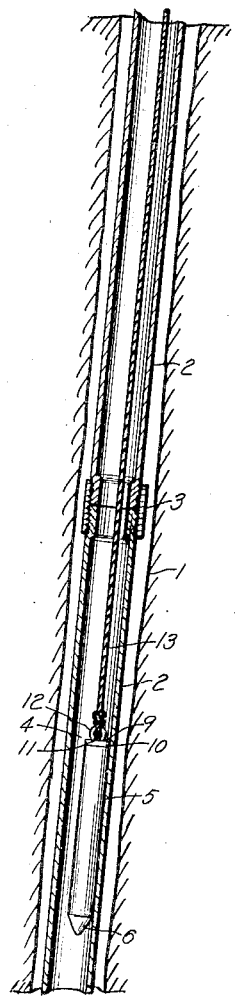
Fig. 1 is a central longitudinal section of a portion of drill pipe, showing an inclinometer suspended therein.
Figure 2:
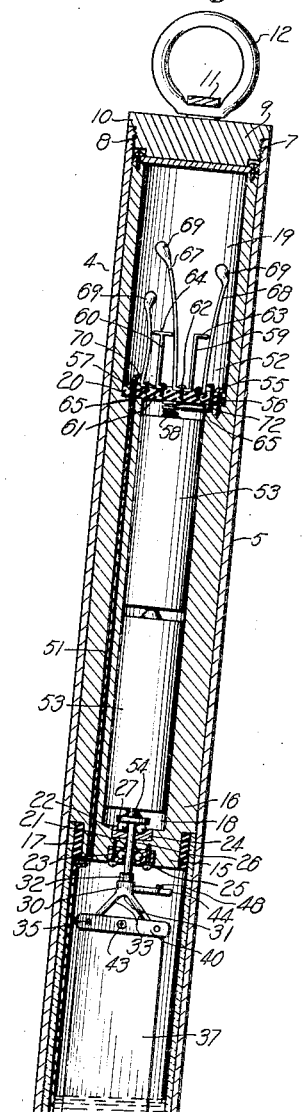
Fig. 2 is a central longitudinal section of the inclinometer in inclined position, illustrating particularly the mechanism for permanently recording the degree of inclination of the device.
Figure 3:
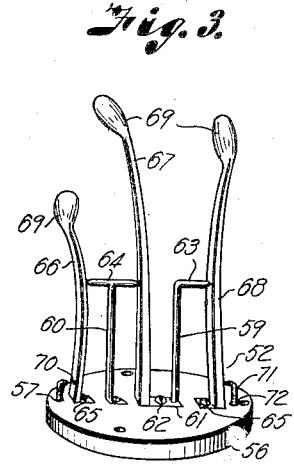
Fig. 3 is a perspective view of a switch element forming a part of the device.
Figure 4:
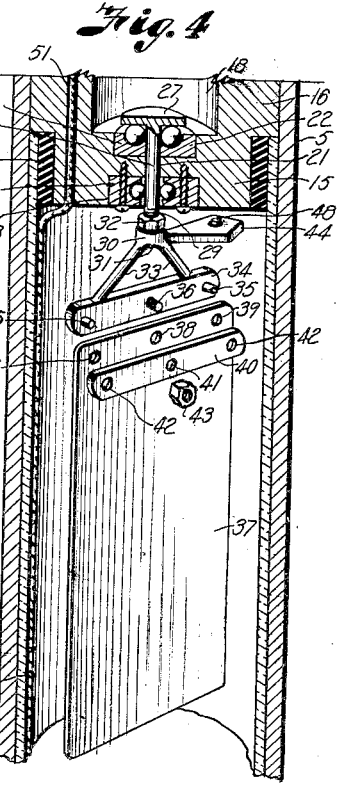
Fig. 4 is an enlarged view, in section, of a portion of the inclinometer housing particularly illustrating the record carrier and a record supported thereon.
Figure 5:
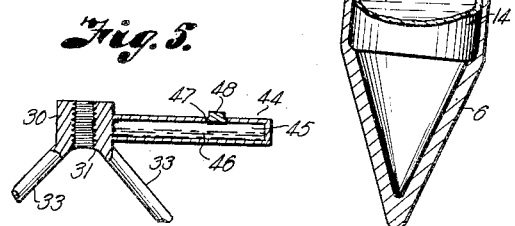
Fig. 5 is a view, in central vertical section, of a portion of the carrier showing a liquid-containing weight.

Referring more in detail to the drawing:

1 designates a portion of a well hole being drilled by a rotary drilling rig including drill pipe sections 2 joined together by drill collars 3.

An inclinometer 4 for determining the degree of inclination from vertical at which a well hole is being drilled includes a cylindrical housing 5, having a pointed lower end 6 to facilitate lowering of the housing through the constricted ends of pipe sections, and being internally threaded on its upper end as indicated at 7 for receiving the reduced, externally threaded end 8 of a cap screw 9, provided with an outwardly directed flange 10 adapted to abut the end of the housing when threaded therein.

Provided on the outer end of the cap screw is a strap 11 for anchoring a ring 12, whereby the housing may be supported from a cable 13 used for lowering the housing into the drill pipe.

Means supported within the housing for recording the inclination of the well hole includes a container 14 preferably formed of glass and seated in the housing adjacent the pointed end 6. The open upper end of the container is adapted to receive the neck portion 15 of a cylindrical body 16 extending throughout the remaining portion of the housing; a sealing ring 17 surrounding the neck portion of the body serving to securely connect the container to the body 16.

The cylindrical body includes a central bore 18 terminating at its lower end adjacent the neck portion 15, and at its upper end in an enlarged bore 19, thereby forming a lateral shoulder 20.

A concentric bearing opening 21 in the neck 15 is counter-bored at its upper and lower ends as indicated at 22 and 23 for respectively seating a thrust bearing 24 and a lower bearing 25 to facilitate rotation of a shaft 26, extending through the opening 21 and having a head 27 adapted to rotate on the thrust bearing.

The lower end of the shaft is threaded as indicated at 29 for receiving the head 30 of a carrier 31, securely maintained in assembled relation on the shaft by a lock nut 32.

Integral with the head 30 and diverging outwardly therefrom, are arms 33 connected at their lower ends to a cross bar 34 having guide pins 35 adjacent its ends and a bolt 36 extending transversely through its center for vertically supporting a record plate 37.

The record plate is preferably rectangular in shape and is provided near its upper end with a central opening 38 for receiving the bolt 36, and with aligning end openings 39 to engage the guide pins 35 when mounted on the carrier.

A keeper bar 40, having openings 41 and 42 aligning respectively with the openings 38 and 39 of the plate, is mounted on the carrier adjacent the plate and is retained in firm relation with the carrier and plate by a nut 43 threaded on the bolt 36.

To automatically rotate the carrier so that the flat faces of the plate will always be in transverse relation to the line of inclination, a weight arm 44 extending to one side of the carrier is formed on the head 30 and is preferably provided with a chamber 45 for containing fluid such as mercury 46 poured into the chamber through an opening 47, normally closed by a plug screw 48, the object in providing the liquid in the weight being to assist in overcoming rotational resistance offered the shaft 26 so that the record obtained will be as accurate as possible.

In order to record permanently on the plate the degree of inclination of the well hole a sufficient amount of liquid 49 is supplied to partly submerge the plate, and a conductor 50 extending into the liquid is led upwardly in the container through a longitudinal opening 51 in the cylindrical body 16, and is connected to a switch element or inharmonic circuit-breaker 52 presently to be described in detail.

Seated in the central bore 18 of the cylindrical body is a pair of battery cells 53 such as are commonly used in flash lights and the like, a contact bearing 54 on the head 27 of the shaft 26 supporting the lower end of the bottom cell.

Secured to the shoulder 20 by screws 55 is an insulating plate 56 having an opening 57 for receiving the conductor 51, and inserted between the upper cell and the insulating plate is a coil spring 58 for urging the battery cells into engagement with each other and with the head 27.

A pair of stationary contact posts 59 and 60 are fixed in sockets 61 in the upper surface of the insulating plate by screws 62, a single arm 63 extending laterally from the upper end of the arm 59, and a cross arm 64 being secured to the upper end of the post 60.

Fixed in like manner to the insulating plate by screws 65 and in alignment with the stationary posts are resilient contact members 66, 67 and 68, each terminating at its upper end in a weighted portion 69. The resilient contact posts comprise spring blades of unequal lengths, resulting in an inharmonic vibratory action of the blades while the housing is being moved, thus preventing closure of the circuit until the housing has come to absolute rest.

The conductor 50 leading through the opening 57 in the insulator plate is attached, as indicated at 70, to the blade 66 and a conductor 71 attached to the plate 68 is led through an opening 72 in the plate and soldered to the spring 58 to complete the circuit when the switch is closed.

Assuming an inclinometer to be constructed and assembled as described, the process of lowering the housing in the string of drill pipe and of recording the degree of inclination would be as follows:

The inclinometer housing is attached to the rope or cable 13 and is lowered into the drill pipe, preferably after each addition of a new drill pipe section to the pipe string.

Due to the vibratory action of the blade springs the circuit through the switch, battery, plate, liquid and conductor is prevented from being closed while the housing is being lowered into the pipe string.

However, as soon as the housing has reached the bottom of the hole and has come to complete rest, the circuit is closed and the electro-plating of the record plate in direct relation to the liquid level in the glass container takes place, only a few minutes being required for this process.

The housing is then elevated and removed from the drill pipe and disassembled, and the plate bearing the record of the condition of the well hole is detached from the carrier and is replaced by a blank plate.

Because of the relatively thin, flat formation of the record plates, they may be conveniently filed for future reference.

The device as described, will readily pass through constricted ends of the smallest drill pipe sections commonly used in drilling oil wells, and since the entire mechanism for recording the plate is contained within the inclinometer housing an efficient and economical device is produced for providing the driller with a constant record of the condition of the well hole in regard to any deviation from vertical at which the hole may be drilled.

What I claim and desire to secure by Letters Patent is:

1. In a device of the character described, a housing, a carrier rotatably mounted in the housing, a plate supported by the carrier, means for recording on the plate the degree of inclination of the housing, and means responsive to vibration of the housing for deferring said recording process until the housing has come to complete rest.

2. In a device of the character described, a housing, a carrier rotatably mounted in the housing, a plate supported by the carrier, means contained in the housing for recording on the plate the degree of inclination of the housing, and means responsive to vibration of the housing for deferring said recording process until the housing has come to complete rest.

3. In a device of the character described, a housing, a blank in the housing, means contained in the housing for recording on the blank the degree of inclination of the housing, means in the housing to defer said recording process until the housing has come to complete rest, including a circuit, stationary contacts, and inharmonic springs adapted to engage said contacts for closing the circuit.

4. In a device of the character described, a housing, liquid in the lower end of the housing, a blank in the housing and extending into the liquid, an electric circuit in the housing including the blank and liquid, and a switch including stationary contacts and inharmonic springs adapted to engage said contacts for closing the circuit to electro-plate the portion of the blank extending into the liquid.

5. In a device of the character described, a housing, liquid in the lower end of the housing, a carrier rotatably mounted in the housing, a plate supported by the carrier and extending into the liquid, a weight on the carrier to maintain the plate in transverse relation to the line of inclination, an electric circuit including the plate and liquid, and a switch including stationary contacts and inharmonic springs adapted to engage said contacts for closing the circuit to electro-plate the portion of the plate extending into the liquid.

6. In a device of the character described, a housing, liquid in the lower end of the housing, a carrier rotatably mounted in the housing, a vertical plate supported by the carrier and extending into the liquid, a liquid-containing weight on the carrier to maintain the plate in transverse relation to the line of inclination, an electric circuit including the plate, liquid and a battery in the housing, and a switch including stationary contacts for closing the circuit to electro-plate the portion of the plate extending into the liquid.

7. In a device of the character described, a housing, a blank in the housing, electroplating means including an electric circuit in the housing for recording on the blank the degree of inclination of the housing, and an inharmonic circuit breaker in said circuit to defer plating of said blank until the device has come to rest.

In testimony whereof I affix my signature.

WILLIAM G. BOTTOM.